(12) United States Patent
Kanie et al.

(10) Patent No.: US 6,715,821 B2
(45) Date of Patent: Apr. 6, 2004

(54) MOLDING FASTENING ASSEMBLY AND MOLDING CLIP

(75) Inventors: Hideki Kanie, Toyohashi (JP); Toru Koike, Toyota (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/256,033

(22) Filed: Sep. 26, 2002

(65) Prior Publication Data

US 2003/0075949 A1 Apr. 24, 2003

(30) Foreign Application Priority Data

Sep. 27, 2001 (JP) ................................. 2001-296985

(51) Int. Cl.$^7$ ................................................ B60J 1/10
(52) U.S. Cl. ..................................... 296/146.15; 296/93
(58) Field of Search .......................... 296/93, 96.21, 296/146.15, 201; 52/204.591, 204.597, 208, 716.6, 716.7

(56) References Cited

U.S. PATENT DOCUMENTS

| | | | | |
|---|---|---|---|---|
| 4,389,068 A | * | 6/1983 | Sengoku ........................ | 296/93 |
| 4,436,337 A | * | 3/1984 | Bowes et al. ................. | 296/201 |
| 4,840,001 A | * | 6/1989 | Kimisawa ..................... | 296/93 |
| 5,139,302 A | * | 8/1992 | Kanke .......................... | 296/93 |
| 5,150,943 A | * | 9/1992 | Gold ............................. | 296/201 |
| 5,154,471 A | * | 10/1992 | Mimura et al. ............... | 296/93 |
| 5,222,336 A | * | 6/1993 | Yada et al. .................... | 296/93 |
| 5,651,578 A | * | 7/1997 | Mistopoulos et al. ....... | 296/201 |
| 5,746,859 A | * | 5/1998 | Gold ............................. | 296/201 |
| 6,089,646 A | * | 7/2000 | Xu et al. ...................... | 296/146.15 |
| 6,205,712 B1 | * | 3/2001 | Ellis ............................. | 49/441 |
| 6,293,609 B1 | * | 9/2001 | Xu et al. ...................... | 296/146.15 |
| 6,546,683 B1 | * | 4/2003 | Senge .......................... | 52/208 |
| 2001/0017005 A1 | * | 8/2001 | Ellis ............................. | 49/40 |

FOREIGN PATENT DOCUMENTS

| | | |
|---|---|---|
| JP | 56-27110 | 3/1981 |
| JP | 3-52217 | 5/1991 |
| JP | 4-90418 | 8/1992 |

\* cited by examiner

*Primary Examiner*—Stephen T. Gordon
*Assistant Examiner*—Lori L Coletta
(74) *Attorney, Agent, or Firm*—Harness, Dickey & Pierce, P.L.C.

(57) ABSTRACT

A mounting assembly for a first ornamental molding (2), comprises a second molding (10) independent of the first ornamental molding (2) and integrally fixed to and along the periphery of a window glass (1), and a molding clip (6) for holding the first molding (2). The molding clip (6) is fixed to the second molding (10 upon a molding process of the second molding. The molding clip (6) includes a body portion (17) defining therein a space for receiving an engagement portion (29) of the first molding, an engagement pawl (18) disposed on the inside of the body portion and adapted to engage with the engagement portion (29) of the first molding, and a flange (19) formed on the outside of the body portion and enclosed in the second molding (10) so as to fix the molding clip (6) to the second molding (10). The molding clip (6) is adapted to be positioned in a gap between the periphery of the window glass and a window frame (11) of a vehicle body by placing the window glass (1) on the window frame (11). The first molding is mounted on the vehicle body by inserting the engagement portion (29) of the first molding into the body portion (17) to bring the engagement portion (29) into engagement with the engagement pawl.

14 Claims, 8 Drawing Sheets

MOLDING FASTENING ASSEMBLY AND MOLDING CLIP

FIELD OF THE INVENTION

The present invention relates to a molding mounting assembly for an ornamental molding for covering over a gap between the periphery of a vehicle window glass and a window frame of a vehicle body, and to a molding clip used for fastening the molding.

BACKGROUND OF THE INVENTION

Generally, in order to provide improved vehicle appearance and prevent rainwater or the like from entering in a gap between a vehicle window glass and a window frame of a vehicle body, an elongated ornamental molding is mounted along the periphery of the window glass to cover over the gap. Japanese Utility Model Laid-Open No. 56-27110 discloses a plastic support member (clip) including a forked clamping portion for clamping the edge of a window glass, and a projecting portion extending from the clamping portion to the sidewall of a vehicle body, wherein the edge of an ornamental molding is brought into engagement with the projecting portion extending from the edge of the window glass, so as to mount the ornamental molding with covering a gap between the periphery of the window glass and a window frame of the vehicle body. This support member provides a simplified mounting operation as well as its simple structure. However, the mounting position can be undesirably moved because the support member is fixed to the window glass in a clamping manner. Specifically, the error in dimension of the window glass causes some displacement of the support member even if the error is minor, and this displacement can lead to inappropriate mounting position of the molding. Japanese Utility Model Laid-Open No. 03-52217 discloses a molding base member (clip) attached to and along the periphery of a window glass in an interfitting manner and formed with a clamping portion for clamping a downward extending support portion of a molding to mount the molding on the window glass. This molding mounting assembly provides a simplified mounting operation, but needs to prepare the molding base member having a configuration conformable to the periphery of the window glass and then interfit the molding base member into and along the periphery of the window glass.

Japanese Utility Model Laid-Open Publication No. 04-90418 discloses a mounting structure including an ornamental molding referred to as a molding-shaped gasket integrally formed on and entirely along the periphery of a window glass, and a clip integrally fixed to the molding, wherein the clip is fixed to a window frame of a vehicle body to mount the window glass to the vehicle body. According to this mounting structure, in addition to the window glass, the ornamental molding can be mounted to the window frame by fixing the clip to the window frame. However, the configuration of the ornamental molding is not simple because the molding is essentially formed integrally on the window glass. Differently from the case of integrally forming a simple molding, forming dies for the ornamental molding becomes complicated, and such complicated forming dies lead to troublesome processing and maintenance. Thus, it is undesirable to form the ornamental molding integrally on the window glass.

It is therefore an object of the present invention to provide a molding mounting assembly and a molding clip capable of securely fixing the ornamental molding separated from a window glass, at a predetermined position through a simplified operation without any adverse effect of an error in dimension of the window glass.

SUMMARY OF THE INVENTION

In order to achieve the above object, there is provided a mounting assembly for a first ornamental molding for covering over a gap between the periphery of a vehicle window glass and a window frame of a vehicle body. The assembly comprises a second molding independent of the first molding and integrally fixed to and along the periphery of the window glass, and a molding clip for holding the first molding. The molding clip is fixed to the second molding upon a molding process of the second molding. The molding clip includes a body portion defining therein a space for receiving an engagement portion of the first molding, an engagement pawl disposed on the inside of the body portion and adapted to engage with the engagement portion of the first molding, and a flange formed on the outside of the body portion and enclosed in the second molding so as to fix the molding clip to the second molding. The molding clip is adapted to be positioned in the gap between the periphery of the window glass and the window frame of the vehicle body by placing the window glass on the window frame. The first molding is mounted on the vehicle body by inserting the engagement portion of the first molding into the body portion to bring the engagement portion into engagement with the engagement pawl.

In this manner, the molding clip is fixed to the second molding integrally fixed to the periphery of the window glass. This makes it possible to eliminate the operation for setting the molding clip on the periphery of the window glass so as to provide simplified mounting operation. Further, the molding clip is never displaced from a predetermined position, and thereby the first molding serving as an ornamental molding can be fastened at an appropriate position. In addition, the molding clip is fixed to the second molding in conjunction of the molding process of the second molding. Thus, the molding clip can be firmly fixed at an accurately controlled position, which provides enhanced positioning accuracy of the first molding.

In the molding mounting assembly of the present invention, the flange of the molding clip may be formed entirely along the circumference of the body portion, and the whole of the circumference of the flange may be entirely enclosed in the second molding. This allows the molding clip to be more securely fixed to the second molding.

The engagement pawl of the molding clip may be resiliently coupled with the body portion through an resilient arm, so that the engagement pawl is resiliently supported. In this case, a portion of the flange may be opposed to the rear side of the front end of the engagement pawl, and the distance between the portion of the flange and the rear side of the front end of the engagement pawl may be arranged to allow the engagement portion of the first molding to be assuredly engaged with the engagement pawl when the engagement portion is inserted into the body portion. This makes it possible to reduce the height of molding clip (the length of molding clip in the thickness direction of the window glass) without degrading the function of the engagement pawl.

The second molding may be provided entirely along the periphery of the window glass, and a plurality of the second moldings may be fixed at predetermined positions of the second molding, respectively, with leaving a certain distance therebetween. This provides more secure fixation of the first molding.

The space formed in the body portion of the molding clip may have a rectangular shape elongated in the longitudinal direction of the first molding, and the space may have a width in the longitudinal direction greater than the width of the engagement portion of the first molding, so that the first molding is attached to the molding clip to be shiftable in the longitudinal direction. This structure allows the displacement between the engagement pawl and the engagement portion.

On the other hand, the space formed in the body portion of the molding clip may have a rectangular shape elongated in the longitudinal direction of the first molding, and the space may have a width in the longitudinal direction substantially equal to the width of the engagement portion of the first molding, so that the first molding is positioned to the molding clip without displacement. This structure can define a reference position.

The molding clip may be insert-molded and integrally fixed to the second molding while the second molding is injection-molded onto the periphery of the window glass. In this case, since the molding clip is placed in an injection molding die, the molding clip can be fixed accurately at a predetermined position without any adverse effect of variations in dimensional accuracy of the window glass.

Further, according to the present invention, there is provided a molding clip for fastening a first ornamental molding to cover over a gap between the periphery of a vehicle window glass and a window frame of a vehicle body. The molding clip comprises a body portion fixed to a second molding which is independent of the first molding and is integrally fixed to and along the periphery of the window glass. The body portion is fixed to the second molding upon a molding process of the second molding. The body portion defines therein a space for receiving an engagement portion of the first molding. The molding clip further comprises an engagement pawl disposed on the inside of the body portion and adapted to engage with the engagement portion of the first molding, and a flange formed on the outside of the body portion and enclosed in the second molding. The first molding is mounted on the vehicle body by inserting the engagement portion of the first molding into the body portion to bring the engagement portion into engagement with the engagement pawl.

This molding clip also makes it possible to eliminate the operation for setting the molding clip on the periphery of the window glass so as to provide simplified mounting operation. Further, the molding clip is never displaced from a predetermined position, and thereby the first molding serving as an ornamental molding can be fastened at an appropriate position. The molding clip can also be firmly fixed to the second molding while keeping enhanced positioning accuracy of the first molding.

In this molding clip, the flange may be formed entirely along the circumference of the body portion, and the whole of the circumference of the flange may be entirely enclosed in the second molding, so that the molding clip is more securely fixed to the second molding.

The engagement pawl may be resiliently coupled with the body portion through an resilient arm, so that the engagement pawl is resiliently supported. In this case, a portion of the flange may be opposed to the rear side of the front end of the engagement pawl, and the distance between the portion of the flange and the rear side of the front end of the engagement pawl may be arranged to allow the engagement portion of the first molding to be assuredly engaged with the engagement pawl when the engagement portion is inserted into the body portion. This makes it possible to reduce the height of molding clip (the length of molding clip in the thickness direction of the window glass) without degrading the function of the engagement pawl.

The space formed in the body portion may have a rectangular shape elongated in the longitudinal direction of the first molding, and the space may have a width in the longitudinal direction greater than the width of the engagement portion of the first molding, so that the first molding is attached to the molding clip to be shiftable in the longitudinal direction. This structure can absorb the difference between the respective positions of the engagement pawl and the engagement portion.

On the other hand, the space formed in the body portion may have a rectangular shape elongated in the longitudinal direction of the first molding, and the space may have a width in the longitudinal direction substantially equal to the width of the engagement portion of the first molding, so that the first molding is positioned to the molding clip without displacement. This structure can position the first molding without any displacement in the longitudinal direction to define a reference position.

BRIEF DESCRIPTION OF THE DRAWINGS

FIGS. 2A–2D are views showing a first molding clip according to the present invention, wherein

FIGS. 3A–3D are views showing a second molding clip according to the present invention, wherein

FIGS. 11A–11D are views showing a modified molding clip according to another embodiment of the present invention, wherein

DETAILED DESCRIPTION OF THE PREFERRED EMBODIMENT

Figure 1:
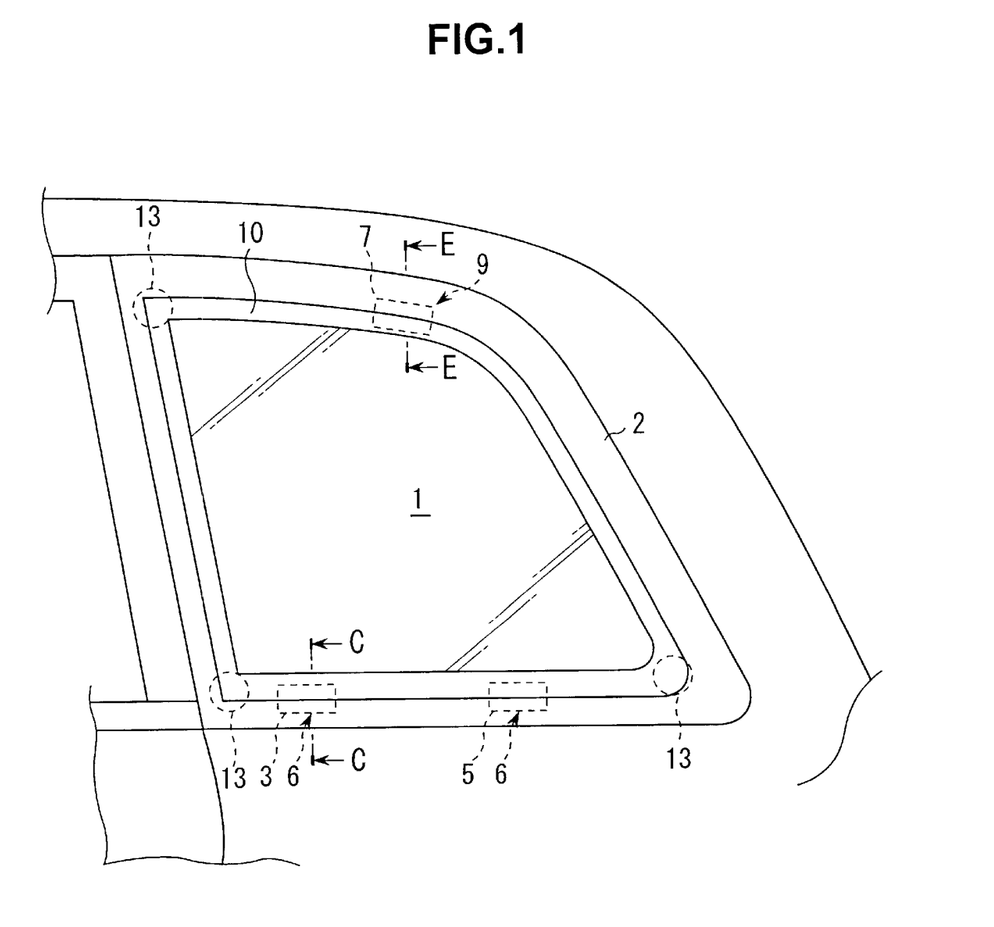
FIG. 1 is a front view of a quarter window glass as one example of a window glass suitable for applying thereto a molding mounting assembly and a molding clip of the present invention.

With reference to the drawings, embodiments of the present invention will now be described. FIG. 1 shows a quarter window glass as one example of a window glass 1 suitable for applying thereto a molding mounting assembly and a molding clip of the present invention. A first ornamental molding 2 or a so-called quarter window molding is mounted on the periphery of the window glass 1 by use of a molding clip according to the present invention to cover over a gap between the periphery of the window glass 1 and a window frame of a vehicle body. In this embodiment, the molding clip according to the present invention includes a pair of first molding clips 6 (refer to FIG. 2 for the details) disposed at two different positions 3 and 5 as shown on the lower side of FIG. 1, respectively, and a second molding clips 9 (refer to FIG. 3 for the details thereof) formed in a configuration slightly different from the first molding clip 6 and disposed at a position 7 as shown on the upper side of FIG. 1. A second molding 10 independent of the ornamental first molding 2 is integrally fixed to and entirely along the circumference of the periphery of the window glass. The second molding 10 is not provided for ornamental purposes but primarily intended to reduce wind noise by being brought into close contact with the window frame 11 (see FIG. 10) to close a gap between the window glass and the window frame 11. For example, the second molding is fixedly formed all around the periphery of the window glass 1 through an injection molding process in which forming dies are arranged around the periphery of the window glass and then fluidic polyvinyl chloride (PVC) is injected into the forming dies. In the present invention, the first molding clips 6 and the second molding clip 9 are fixed to the second molding 10 upon the above molding process of the second molding 10. Specifically, during the injection molding process of the second molding 10, the first molding clips 6 and the second molding clip 9 are insert-molded and fixed to the second molding 10.

In order to hold the quarter window glass or the window glass 1 with positioning the window glass 1 to the window frame of the vehicle body, three positioning clips 13 are provided at three corners of the window glass 1, respectively. The positioning clips 13 are typically used to position and temporarily fix the window glass 1, and then the window glass 1 is fully fixed to the vehicle body with an adhesive 14 (see FIGS. 6 and 7) applied between the lower surface of the second molding and the window frame.

Figure 2A:
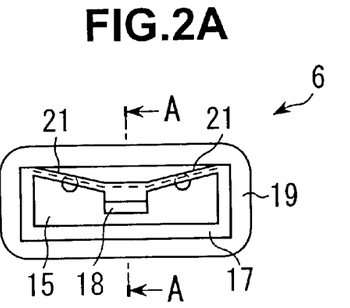
FIG. 2A is a top plan view of the first molding clip.
Figure 2B:
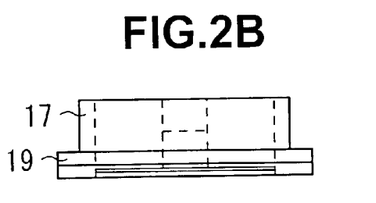
FIG. 2B is a front view of the first molding clip.
Figure 2C:
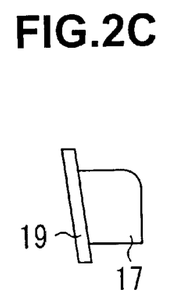
FIG. 2C is a left side view of the first molding clip in FIG. 2A.
Figure 2D:
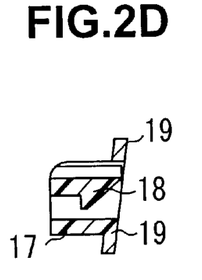
FIG. 2D is a sectional view of the first molding clip taken along the line A—A of FIG. 2A.

FIGS. 2A to 2D show the details of the first molding clip 6 according to the above embodiment of the present invention. FIG. 2A is a top plan view of the first molding clip 6, FIG. 2B is a front view of the first molding clip 6, FIG. 2C is a left side view of the first molding clip 6 in FIG. 2A, and FIG. 2D is a sectional view of the first molding clip 6 taken along the line A—A of FIG. 2A. The first molding clip 6 is a one-piece integrally molded product made of a plastic material. The first molding clip 6 comprises a body portion 17 defining therein a rectangular space 15 for receiving an engagement portion of the first molding 2, an engagement pawl 18 disposed on the inside of the body portion 17 and adapted to engage with the engagement portion of the first molding 2, and a flange 19 formed on the outside of the body portion 17. The engagement pawl 18 extends toward the center of the space 15, and the body portion 17 resiliently supports the engagement pawl through a pair of resilient arms 21, 21 connected to opposite sides of the engagement pawl, respectively. The body portion 17 includes three walls defining three sides of the rectangular space 15 surrounding the engagement pawl 18 and the resilient arms 21. The flange 19 is formed at the end of the body portion 17 on the side of the receiving portion of the space 15 for receiving the engagement portion of the first molding, to surround the entire outer periphery of the body portion 17. As shown in FIGS. 2C and 2D, the flange 19 is formed to the body portion 17 with some amount of inclination conformable to the orientation of the first molding clip 6 placed on the window frame.

Figure 3A:
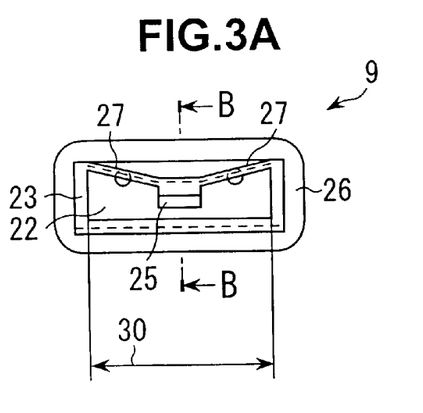
FIG. 3A is a top plan view of the second molding clip.
Figure 3B:
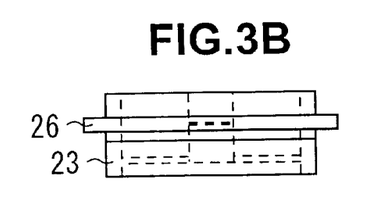
FIG. 3B is a front view of the second molding clip.
Figure 3C:
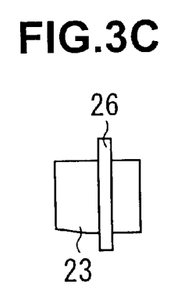
FIG. 3C is a left side view of the second molding clip in FIG. 3A.
Figure 3D:
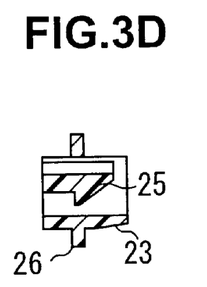
FIG. 3D is a sectional view of the second molding clip taken along the line B—B of FIG. 3A.

FIGS. 3A to 3D show the details of the second molding clip 9 according to the above embodiment of the present invention. FIG. 3A is a top plan view of the second molding clip 9, FIG. 3B is a front view of the second molding clip 9, FIG. 3C is a left side view of the second molding clip 9 in FIG. 3A, and FIG. 3D is a sectional view of the second molding clip 9 taken along the line B—B of FIG. 3A. The second molding clip 9 is a one-piece integrally molded product made of a plastic material. The second molding clip 9 comprises a body portion 23 defining therein a rectangular space 22 for receiving an engagement portion of the first molding 2, an engagement pawl 25 disposed on the inside of the body portion 23 and adapted to engage with the engagement portion of the first molding 2, and a flange 23 formed on the outside of the body portion 23. The engagement pawl 25 extends toward the center of the space 22, and the body portion 23 resiliently supports the engagement pawl through a pair of resilient arms 27, 27 connected to opposite sides of the engagement pawl 25, respectively. The body portion 17 includes three walls defining three sides of the rectangular space 22 surrounding the engagement pawl 25 and the resilient arms 27. Differently from the first molding clip 6, the flange 26 is formed at the midpoint of the height of the body portion 23 to surround the entire outer periphery of the body portion 23. As shown in FIGS. 3C and 3D, the body portion 23 has a slightly slanted inlet region for receiving the engagement portion of the first molding 2. Although the second molding clip 9 and the first molding clip 6 are slightly different from one another in position of the respective flanges and in configuration of the respective body portions, they have essentially equivalent function and structure.

Each of the spaces 15 and 22 which are defined by the body portions 17 and 23 of the first and second molding clips 6 and 7, respectively, and adapted to receive the engagement portion 29 (see FIGS. 7 and 8) of the first molding 2 is formed in a rectangular shape elongated in the longitudinal direction of the first molding 2. The length 30 in FIG. 3(A) indicates the width of the space 22 (and 15). In one embodiment, the space 22 (15) has a width 30 in the longitudinal direction (or the longitudinal direction of the first molding 2) greater than the width 31 (see FIG. 8) of the engagement portion 29 of the first molding 2. This allows the first molding 2 to be attached to the first or second molding clip 6, 9, to be shiftable in the longitudinal direction or in a longitudinally shiftable manner. Thus, an error in position between the engagement pawl 25 (or 18) and the engagement portion 29 can be absorbed or corrected. In another embodiment, the space 22 (15) has a width 30 in the longitudinal direction substantially equal to the width 31 of the engagement portion 29 of the first molding 2. This allows the first molding 2 to be positioned to the molding clip 9 (or 6) without any displacement. This can define a reference position of the first molding 2. That is, the width of the space is selectively determined depending on the purpose of the molding clip.

Figure 4:
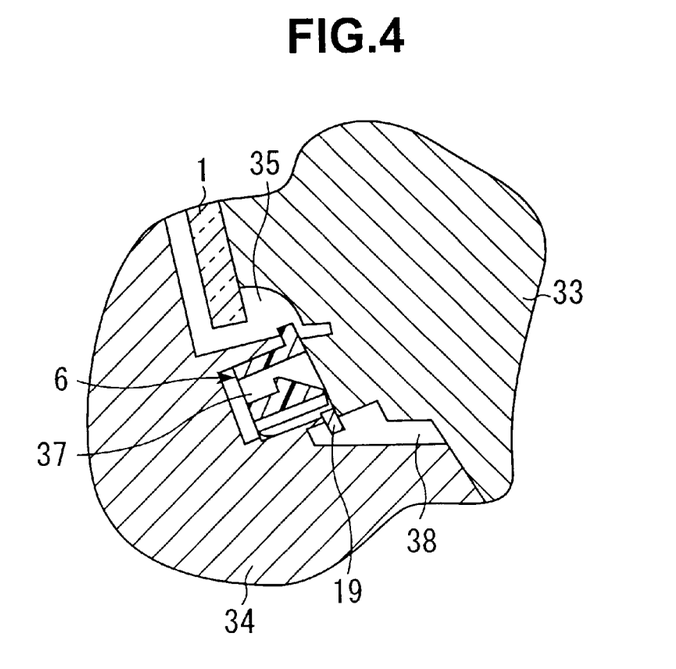
FIG. 4 is a sectional view taken along the line C—C of FIG. 1, showing the condition when the first molding clip of FIG. 1 is insert-molded to the second molding during the injection molding process of the second molding.
Figure 5:
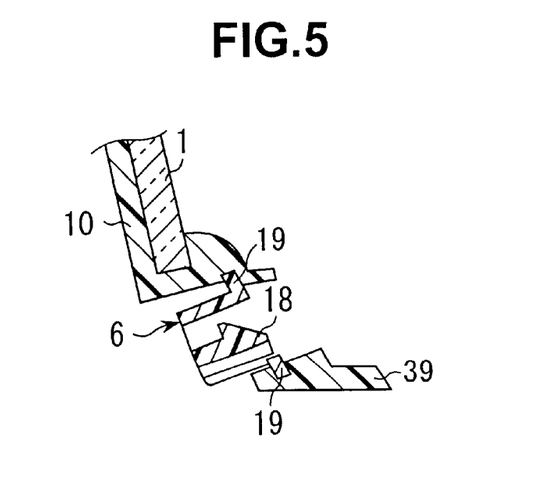
FIG. 5 is a view showing the condition after the first molding clip is fixed to the second molding through the molding process in FIG. 4.

FIGS. 4 and 5 show the condition when the first molding clip 6 is insert-molded and fixed to the second molding 10 during the injection molding process of the second molding. Although these figures show only the first molding clip 6 to be fixed to the second molding 10 for the sake of simplicity, it is to be understood that the second molding clip 9 can be fixed to the second molding 10 in the same way. In FIG. 4, a first forming die 33 on the side of the front surface of the window glass 1 and a second forming die 34 on the side of the rear side (the passenger room side) of the window glass 1 are disposed around the periphery of the window glass 1. A cavity 35 is defined between the first and second forming dies 33 and 34 to mold the second molding 10 along the periphery of the window glass 1. Another cavity 37 is also defined between the first and second forming dies 33 and 34 to hold the first molding clip 6 as an insert. Still another cavity 38 is defined between the first and second forming dies 33 and 34 to mold an extended portion of the second molding 10 which surrounds the circumference of the flange 19 of the first molding clip 6 to fix the first molding clip 6 to the second molding 10 and has a contour conformable to the surface of the window frame. As shown in FIG. 4, the first and second forming dies 33 and 34 are disposed around the periphery of the window glass 1, and the first molding clip 6 is positioned between the forming dies. Then, by injecting fluidic polyvinyl chloride (PVC) into the spaces 35, 37 and 38, the second molding 10 is injection-molded, and the first molding clip 6 is fixed to the second molding 10 through insert molding.

FIG. 5 shows the second molding 10 integrally fixed to and along the periphery of the window glass 1, and the first molding clip 6 fixed to the second molding 10 upon the molding process of the second molding 10. The circumference of the flange 19 of the first molding clip 6 is entirely enclosed in the second molding 10. The reference numeral 35 of FIG. 5 indicates a seat portion of the second molding 10 to be placed on the bottom surface of the window frame. This seat portion 39 is integral with other portions of the second molding 10, and thereby the first molding clip 6 is firmly fixed to the second molding 10 through the seat portion. The seat portion 39 has a configuration conformable to the window frame for mounting the window glass 1 thereon. In this manner, the second molding 10 is molded with fixing thereto the pair of first molding clips 6 and the single second molding clip 9 at the positions 3, 5 and 7 as shown in FIG. 1.

Figure 6:
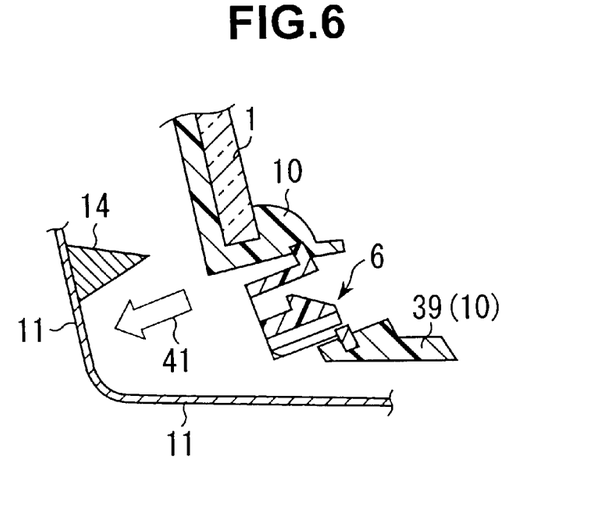
FIG. 6 is a view showing an operation for mounting the window glass of FIG. 5 having the second molding and the first molding clip fixed thereto, on a window frame of a vehicle body.

FIGS. 6 to 9 show an operation for mounting the window glass 1 on the window frame 11 of the vehicle body, and then mounting the first ornamental molding 2 to cover over the gap between the periphery of the window glass 1 and the window frame 11 of the vehicle body. As shown in FIG. 6, an adhesive 14 for fixing the window glass 1 is applied at a predetermined position of the window frame 11. In this condition, the window glass 1 having the second molding 10 and the first and second molding clips 6 and 9 fixed thereto is moved toward the window frame 11 or in the direction shown by the arrow 41 to be brought into contact with the adhesive 14 and pressed onto the window frame 11, and the seat potion 39 of the second molding 10 is seated on the bottom surface of the window frame 11. When the window glass is pressingly placed on the window frame, the positioning clips at the three corners as shown in FIG. 1 act to temporarily retain the window glass 1 to the window frame 11 with adequate positioning accuracy and keep this condition until the adhesive 14 is cured and the window glass 1 is fully fixed to the window frame 11. The operation for mounting the first ornamental molding 2 can be carried out before the window glass 1 is fully fixed to the window frame 11.

Figure 7:
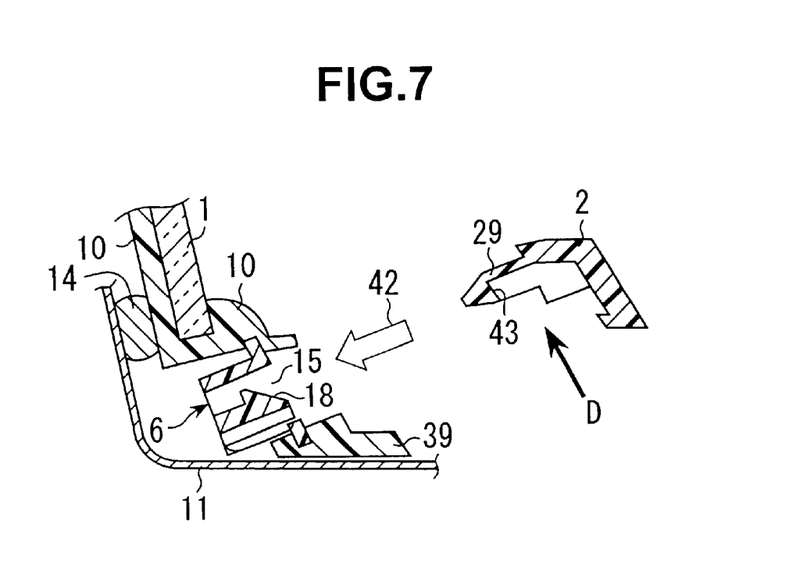
FIG. 7 is a view showing an operation for attaching the first molding to the window glass of FIG. 6 with the second molding and the first molding clip after the window glass is mounted on the window frame.
Figure 8:
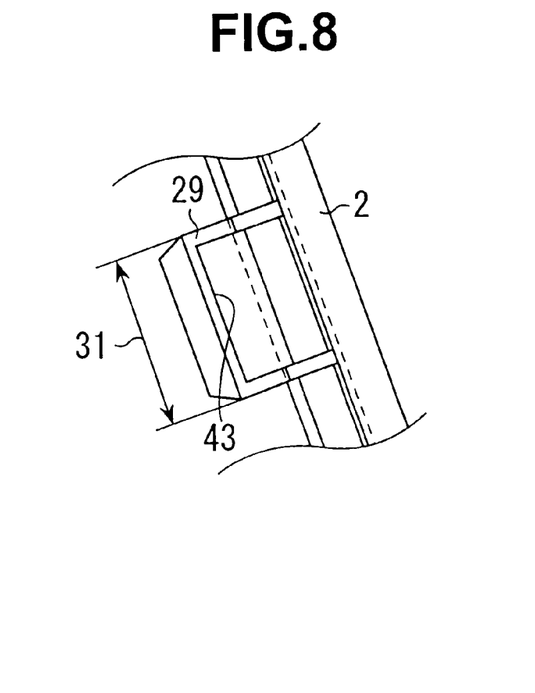
FIG. 8 is a view of an engagement portion of the first molding of FIG. 7 when seen from the direction D.

In FIG. 7, after the window glass 1 is positioned and retained to the window frame 11, the first ornamental molding 2 is moved in the direction shown by the arrow 42. The first molding 2 has engagement portions formed at positions thereof corresponding to the pair of first molding clip 6 and the single second molding clip 9 and each adapted to engage with the engagement pawl of the corresponding molding clip. FIGS. 7 and 8 show the configuration of the engagement portion 29 of the first molding 2 adapted to engage with the engagement pawl 18 of the first molding clip 6. The engagement portion 29 protrudes from the first molding 2 and has a broadened plate shape. The front end of the engagement portion is formed with a hook 43 adapted to engage with the engagement pawl 18. As already described, the space 15 (see FIG. 2) of the molding clip 6 has the width (corresponding to the width 30 in FIG. 3) greater than or substantially equal to the width 31 of the engagement portion 29. This makes it possible to absorb an error in relative position between the engagement pawl 18 and engagement portion 28 or to fix the first molding 2 immovably to the molding clip 6 so as to provide a reference position for fixing the first molding 2. The engagement portion 29 of the first molding 2 is fixed to the first molding clip by putting the engagement portion 29 of the first molding 2 in the space 15 of the first molding clip 6, and then pushing the first molding 2 in the direction shown by the arrow 42 to bring the engagement portion 29 into engagement with the engagement pawl 18.

Figure 9:
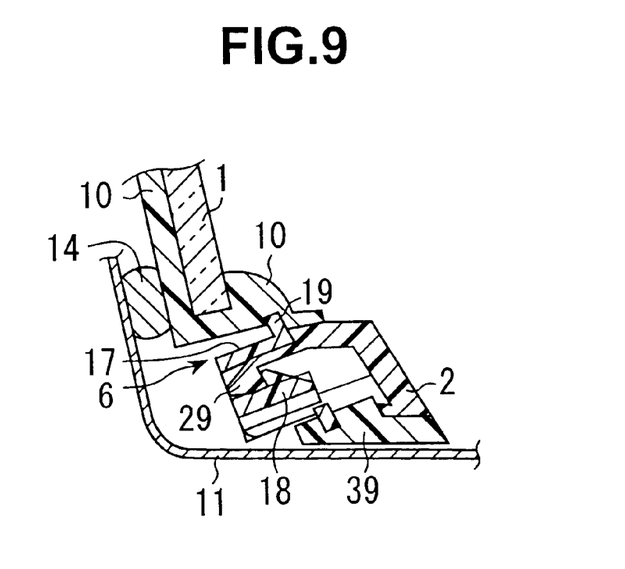
FIG. 9 is a view showing the condition after the window glass of FIG. 7 with the second molding and the first molding clip is mounted on the window frame, and then the first molding is attached to the first molding clip to cover over a gap between the periphery of the window glass and the window frame.
Figure 10:
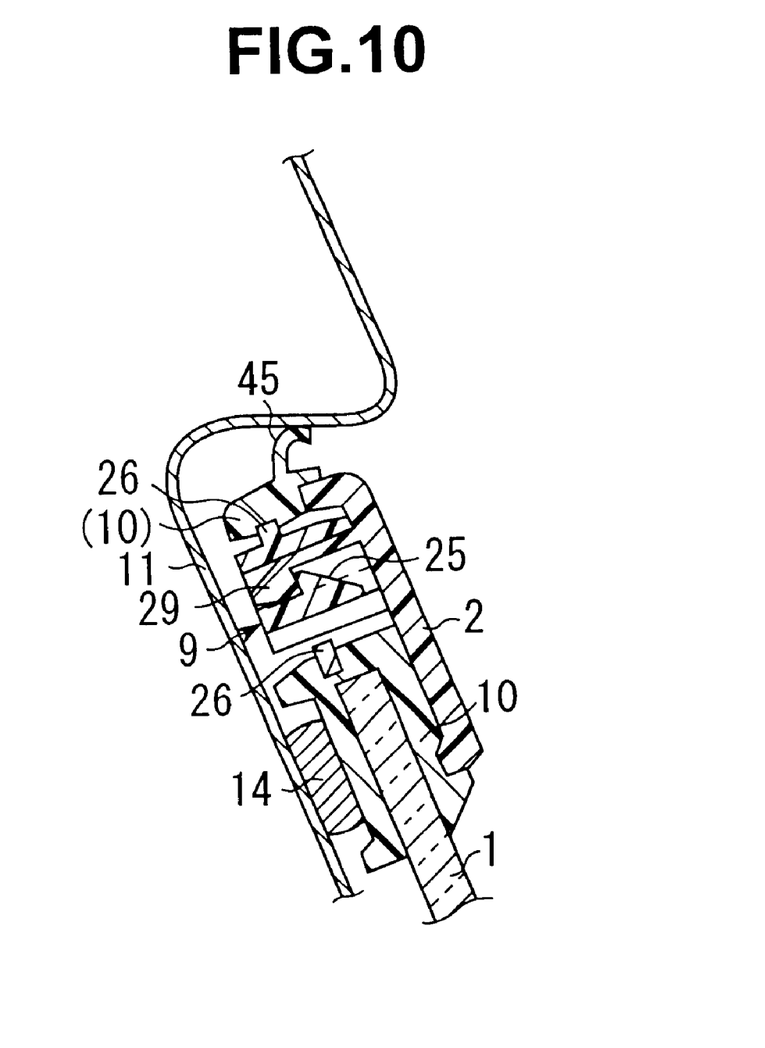
FIG. 10 is a sectional view showing the condition after the window glass with the second molding and the second molding clip is mounted on the window frame, and then the first molding is attached to the second molding clip to cover over the gap between the periphery of the window glass and the window frame, taken along the line E—E of FIG. 1.

The above fixing action is performed synchronously in another first molding clip 6 and the second molding clip 9. FIG. 9 shows the condition after the first molding 2 is attached to the first molding clip 6. FIG. 10 shows the condition after the first molding 2 is attached to the second molding clip 9. As shown in FIG. 10, the engagement portion 29 of the first molding 2 has a configuration slightly different from that in FIG. 9. Further, Although the second molding 10 wraps around the flange 26 of the second molding clip 9 to firmly hold the second molding clip 9, the second molding 10 has a configuration slightly different from that of the second molding 10 in FIG. 9. In particular, the second molding 10 is formed with an resilient lip 45 to filling up a gap between the second molding and the window frame 11. However, the engagement pawl 25 of the second molding clip 9 in FIG. 10 also engages with the engagement portion 29 of the first molding 2 to fix the first molding 2 to the second molding clip 9. Through the above fixing actions, the first molding 2 is mounted on the vehicle body to cover over the gap between the window frame 11 and the second molding 10 formed around the periphery of the window glass 1.

Figure 11A:
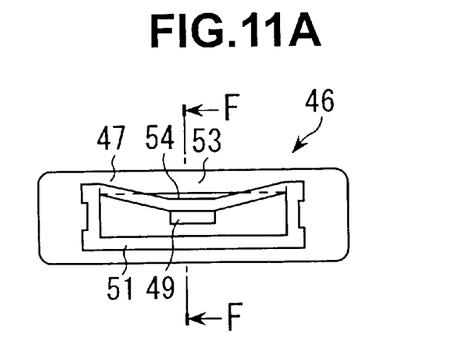
FIG. 11A is a top plan view of the molding clip.
Figure 11B:
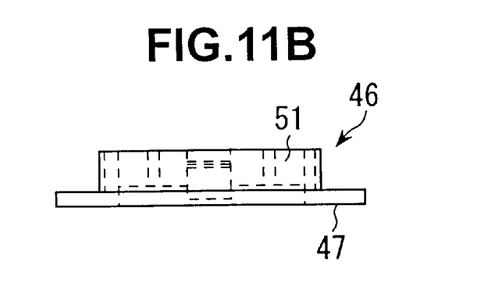
FIG. 11B is a front view of the molding clip.
Figure 11C:
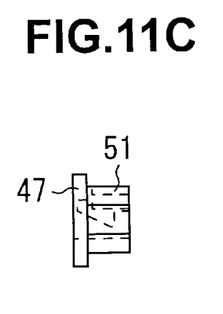
FIG. 11C is a left side view of the molding clip in FIG. 11A.
Figure 11D:
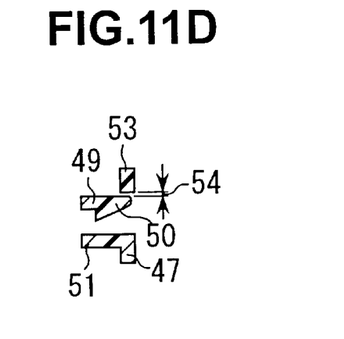
FIG. 11D is a sectional view of the molding clip taken along the line F—F of FIG. 11A.

FIGS. 11A to 11D show a molding clip 46 according to another embodiment of the present invention. FIG. 11A is a top plan view of the molding clip 46, FIG. 11B is a front view of the molding clip 46, FIG. 11C is a left side view of the molding clip 46 in FIG. 11A, and FIG. 11D is a sectional view of the molding clip 46 taken along the line F—F of FIG. 11A. The molding clip 46 includes a body portion 51 having a lower height and an engagement pawl having a smaller size as compared to the first or second molding clip 6 or 9 to reduce the entire size of the molding clip so as to provide reduced space to be occupied by the molding clip. However, if the first molding clip 6 or the like is formed the body portion having a reduced height and the engagement pawl having a reduced size without careful consideration, the fastening force of the engagement pawl can be degraded, and therefore, when the engagement portion of the first molding engaged with the engagement pawl is applied with some force acting to pull out the first molding, the engagement pawl will be undesirably twisted, resulting in unintended disengagement of the first molding. From this point of view, the molding clip 46 has a flange 47 partially opposed to the rear side of the front end 50 of the engagement pawl 49. Further, the height of the body portion 51 is arranged to be lower than that of the body portion of the first or second molding clip 6, 9. The distance 54 between the portion 53 of the flange 47 opposed to the front end of the engagement pawl and the rear side of the front end 50 of the engagement pawl is arranged to allow the engagement portion 29 of the first molding 2 to be assuredly engaged with the engagement pawl 49 when the engagement portion 29 is inserted into the body portion 51.

Figure 12:
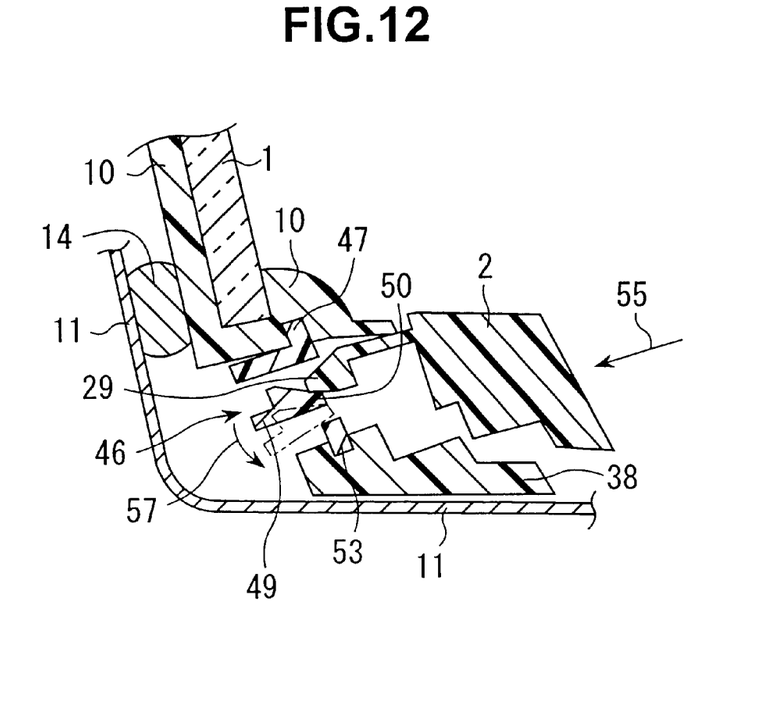
FIG. 12 is a view showing the condition when the window glass with the second molding and the modified molding clip is mounted on the window frame, and then the first molding is attached to the modified molding clip to cover over the gap between the periphery of the window glass and the window frame.

FIG. 12 shows the condition when the first molding 2 is attached to cover over the gap between the window frame 11 and the window glass 1 by use of the molding clip 46 fixed to the second molding 10 upon the molding process for fixedly forming the second molding 10 along the periphery of the window glass 1. When the first molding 2 is pressingly moved in the direction shown by the arrow 55 to insert the engagement portion 29 of the first molding 2 into the molding clip 46, the front end of the engagement portion 29 is brought into contact with the front end of the engagement pawl 49. When the engagement portion 29 is further inserted into the molding clip 46, it was observed that the front end of the engagement pawl 49 was brought into contact with the flange portion 53 opposed to the front end of the engagement pawl and then the engagement pawl 49 was bent outward about the contact portion of the engagement pawl in the direction shown by the arrow 57 of FIG. 12. This bending allows the engagement portion 29 to be further inserted the molding clip 46, so as to assure the engagement between the engagement portion 29 and the engagement pawl 49. The bending would result from the engagement pawl 49 downsized in the height direction of the body portion 51 and supported by the pair of resilient arms as described above.

Figure 13:
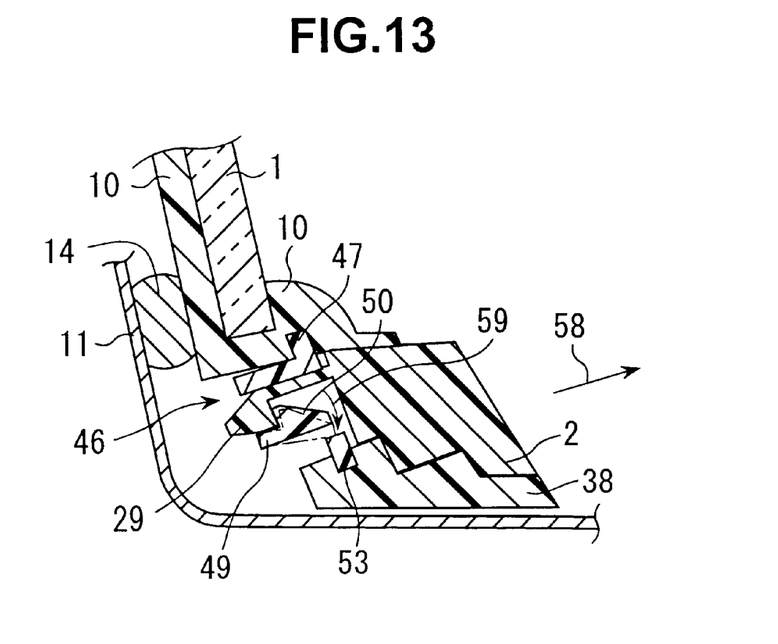
FIG. 13 is a view showing the condition when the first molding attached to the modified molding clip with covering over the gap between the periphery of the window glass and the window frame from the position shown in FIG. 12 is applied with a force acting to pull out the first molding.

FIG. 13 shows the condition when the engagement portion 29 of the first molding 2 engaged with the engagement pawl is applied with a force (arrow 58) acting to pull out the first molding. In this case, the engagement portion 29 moves to get out of the engagement pawl 49 and acts on the front end of the engagement pawl 49 to generate therein a torsional force as shown by the arrow 59. However, when the front end 50 of the engagement pawl is brought into contact with the flange portion 53 opposed to the front end of the engagement pawl, the flange portion 53 acts as a stopper for preventing the engagement pawl from being further twisted. Thus, the molding clip 46 can reliably retain the first molding 2 even if the first molding 2 is applied with a force acting to pull out the first molding.

According to the present invention, the molding clip is fixed to the second molding integrally fixed to the periphery of the window glass. This makes it possible to eliminate the operation for setting the molding clip on the periphery of the window glass so as to provide simplified mounting operation. Further, the molding clip is never displaced from a predetermined position, and thereby the first molding serving as an ornamental molding can be fastened at an appropriate position. In addition, the molding clip is fixed to the second molding in conjunction of the molding process of the second molding. Thus, the molding clip can be firmly fixed at an accurately controlled position, which provides enhanced positioning accuracy of the first molding. The molding clip according to the present invention also makes it possible to eliminate the operation for setting the molding clip on the periphery of the window glass. Further, the molding clip is never displaced from a predetermined position, and thereby the first molding serving as an ornamental molding can be fastened at an appropriate position. The molding clip can also be firmly fixed to the second molding while keeping enhanced positioning accuracy of the first molding.

We claim:

1. A molding mounting assembly for a first molding for covering over a gap between the periphery of a vehicle window glass and a window frame of a vehicle body, said molding mounting assembly comprising:

a second molding independent of said first molding and integrally fixed to and along the periphery of said vehicle window glass; and a molding clip for holding said first molding, said molding clip being fixed to said second molding upon a molding process of said second molding, said molding clip including a body portion defining therein a space for receiving an engagement portion of said first molding, an engagement pawl disposed on the inside of said body portion and adapted to engage with said engagement portion of said first molding, and a flange formed on the outside of said body portion and enclosed in said second molding so as to fix said molding clip to said second molding, said molding clip being adapted to be positioned in the gap between the periphery of said vehicle window glass and the window frame of said vehicle body by placing said vehicle window glass on said window frame, whereby said first molding is mounted on the vehicle body by inserting said engagement portion of said first molding into said body portion to bring said engagement portion into engagement with said engagement pawl.

2. A molding mounting assembly as defined in claim 1, wherein said flange of said molding clip is formed entirely along the circumference of said body portion, and the whole of the circumference of said flange is enclosed in said second molding.

3. A molding mounting assembly as defined in claim 1, wherein said engagement pawl of said molding clip is resiliently coupled with said body portion through resilient arms.

4. A molding mounting assembly as defined in claim 3, wherein a portion of said flange is opposed to the rear side of the front end of said engagement pawl, wherein the distance between the portion of said flange and the rear side of the front end of said engagement pawl is arranged to allow said engagement portion of said first molding to be assuredly engaged with said engagement pawl when said engagement portion is inserted into said body portion.

5. A molding mounting assembly as defined in claim 1, wherein said second molding is provided entirely along the periphery of said vehicle window glass, and a plurality of second molding clips are fixed at predetermined positions of said second molding, respectively, leaving a certain distance therebetween.

6. A molding mounting assembly as defined in claim 1, wherein said space formed in said body portion of said molding clip has a rectangular shape elongated in the longitudinal direction of said first molding, wherein said space has a width in said longitudinal direction greater than the width of said engagement portion of said first molding, whereby said first molding is attached to said molding clip to be shiftable in said longitudinal direction.

7. A molding mounting assembly as defined in claim 1, wherein said space formed in said body portion of said molding clip has a rectangular shape elongated in the longitudinal direction of said first molding, wherein said space has a width in said longitudinal direction substantially equal to the width of said engagement portion of said first molding, whereby said first molding is positioned to said molding clip without displacement.

8. A molding mounting assembly as defined in claim 1, wherein said molding clip is insert-molded and integrally fixed to said second molding when said second molding is injection-molded onto the periphery of said vehicle window glass.

9. A molding clip for fastening a first molding to cover over a gap between the periphery of a vehicle window glass and a window frame of a vehicle body, said molding clip comprising:

a body portion fixed to a second molding which is independent of said first molding and is integrally fixed to and along the periphery of said vehicle window glass, said body portion being fixed to said second molding upon a molding process of said second molding, said body portion defining therein a space for receiving an engagement portion of said first molding;

an engagement pawl disposed on the inside of said body portion and adapted to engage with said engagement portion of said first molding; and a flange formed on the outside of said body portion and enclosed in said second molding, whereby said first molding is mounted on the vehicle body by inserting engagement portion of said first molding into said body portion to bring said engagement portion into engagement with said engagement pawl.

10. A molding clip as defined in claim 9, wherein said flange is formed entirely along the circumference of said body portion, and the whole of the circumference of said flange is enclosed in said second molding.

11. A molding clip as defined in claim 9, wherein said engagement pawl is resiliently coupled with said body portion through an resilient arm.

12. A molding clip as defined in claim 11, wherein a portion of said flange is opposed to the rear side of the front end of said engagement pawl, wherein the distance between the portion of said flange and the rear side of the front end of said engagement pawl is arranged to allow said engagement portion of said first molding to be assuredly engaged with said engagement pawl when said engagement portion is inserted into said body portion.

13. A molding clip as defined in claim 9, wherein said space formed in said body portion has a rectangular shape elongated in the longitudinal direction of said first molding, wherein said space has a width in said longitudinal direction greater than the width of said engagement portion of said first molding, whereby said first molding is attached to said molding clip to be shiftable in said longitudinal direction.

14. A molding clip as defined in claim 9, wherein said space formed in said body portion has a rectangular shape elongated in the longitudinal direction of said first molding, wherein said space has a width in said longitudinal direction substantially equal to the width of said engagement portion of said first molding, whereby said first molding is positioned to said molding clip without displacement.

* * * * *